United States Patent [19]

Sekimura

[11] 4,047,805
[45] Sept. 13, 1977

[54] RIPPLE-FREE DICHROIC MIRRORS

[75] Inventor: Nobuyuki Sekimura, Kanagawa, Japan

[73] Assignee: Canon Kabushiki Kaisha, Japan

[21] Appl. No.: 598,219

[22] Filed: July 23, 1975

Related U.S. Application Data

[63] Continuation-in-part of Ser. No. 440,029, Feb. 6, 1974, abandoned.

[30] Foreign Application Priority Data

Feb. 14, 1973  Japan .................... 48-18139

[51] Int. Cl.² .................... G02B 5/28; G02B 27/14
[52] U.S. Cl. .................... 350/166; 350/171
[58] Field of Search .................... 350/163–166, 350/171; 427/166

[56] References Cited

U.S. PATENT DOCUMENTS

| | | | |
|---|---|---|---|
| 2,338,234 | 1/1944 | Dimmick | 427/166 |
| 2,422,954 | 6/1947 | Dimmick | 350/166 |
| 2,624,238 | 1/1953 | Widdop et al. | 350/166 |
| 2,890,624 | 6/1959 | Widdop et al. | 350/166 |
| 3,697,153 | 10/1972 | Zycha | 350/166 |
| 3,737,210 | 6/1973 | Howe | 350/166 |
| 3,781,090 | 12/1973 | Sumita | 350/166 |

OTHER PUBLICATIONS

Gisin et al., "Optics & Spectkoscopy," vol. XIV, No. 3, Mar. 1963, pp. 210–212.

Primary Examiner—Jon W. Henry
Attorney, Agent, or Firm—McGlew and Tuttle

[57] ABSTRACT

A dichroic mirror is made up of alternating layers of a material having a high index of refraction and a material having a low index of refraction arranged in a stack on one surface of a substrate. The dichroic mirror is effective to separate light in the visible spectrum range, incident thereupon, into two components, one of which is transmitted and the other of which is reflected. Each of the first, second and last layers in the stack, counting outwardly from the substrate, is controlled to an optical thickness deviated from an odd number of quarter-wavelengths of a design wavelength in air, to effect a uniform distribution of transmittance coefficients over the transmitted components.

18 Claims, 19 Drawing Figures

RIPPLE-FREE DICHROIC MIRRORS

CROSS REFERENCE TO RELATED APPLICATION

This is a continuation-in-part of our copending application Ser. No. 440,029 filed on Feb. 6, 1974 and now abandoned.

BACKGROUND OF THE INVENTION

This invention relates to dichroic mirrors which can, if the incident light has a spectral distribution of a continuous character, produce light energy of uniform distribution or free from ripples over the transmitted light components.

Dichroic mirrors have found their uses, for example, in the three-color component beam splitting system disposed in the path of a single incoming beam of light between the objective lens and the pick up tube of a color television camera. The incoming beam of white light impinging on the dichroic mirror is divided into two light components, one of which is reflected and another of which which is transmitted. The reflected and transmitted components are in complementary relationship to each other. The reflection and complementary transmission characteristics of the dichroic mirror are utilized in the aforesaid beam splitting system to provide color separation images of a given object being recorded in the pick up tubes. Most commonly, the necessary color separation is achieved by disposing two dichroic mirrors, namely, a blue-reflector dichroic mirror I and a red-reflector dichroic mirror II in a spatial relation such as shown in FIG. 1. Both mirrors transmit a green band while respectively reflecting the blue band or the red band, with the result that the beam of white light reflected from the object being recorded is separated, in passing through the beam splitting system, into red, green and blue light. It is desirable that the transmission characteristics of the blue-reflector and red-reflector dichroic mirrors are uniform in spectral distribution, or otherwise the distribution of the light energy in the green spectrum region cannot be made uniform so that high grade imagery is not effected without color shift.

One type of dichroic mirror as shown in FIG. 2 is formed having alternating layers of a material having a high index of refraction H and a material having a low index of refraction L vacuum deposited on a transparent substrate 3 in the order such that the first layer adjacent to the substrate being of high index material, and the outermost layer is exposed to ambient air. Vacuum deposition represents one method for forming the layers since it allows precise control of the thickness of the layers. To attain a maximum reflectance at a design wavelength $\lambda$ in air, the optical thicknesses of a high index layer and the next low index layer should be controlled in a ratio of either $3\lambda 4 : \lambda 4$, or $\lambda 4 : \lambda 4$ in terms of the design wavelength $\lambda$ as far as blue-reflector and red-reflector dichroic mirrors are concerned. In the prior art, almost all the layers had an optical thickness of substantially an odd number of one-quarter wavelengths of the design wavelength. For this reason, conventional blue-reflector dichroic mirrors provide a transmission passband having a large ripple from 500 m$\mu$ to 600 m$\mu$ in a longer wavelength, range than the design wavelength as shown at curve $a$ in FIG. 4 (for $3\lambda/4 : \lambda/4$ : type multilayered structure) and at curve $c$ in FIG. 5 (for $\lambda/4 : \lambda/4$ type multilayered structure), while conventional red-reflector dichroic mirrors provide a transmission passband having a large ripple from 500 m$\mu$ to 560 m$\mu$ in a shorter wavelength range than the design wavelength as shown at curves $b$ and $d$ in FIGS. 4 and 5.

As is the case in the dichroic mirror of the type shown in FIG. 2, another type of dichroic multilayer mirror as shown in FIG. 3 is formed of alternating layers of a material having a high index of refraction H and a material having a low index of refraction L. The thickness of the layers of FIG. 3 is in the same order as the thickness of the layers of FIG. 2. However, in FIG. 3, the layers are arranged in the reverse order, i.e. low index, high index, low index and so on, rather than high index, low index and high index as in FIG. 2. To maximize the reflectance at a design wavelength, therefore, the optical thicknesses of a low index layer and the next high index layer should be controlled in a ratio of either $\lambda/4 : 3\lambda 4$, or $\lambda/4 : \lambda/4$ in terms of the design wavelength $\lambda$, as far as prior art blue-reflector and red-reflector dichroic mirrors are concerned. With this arrangement, likewise as above, the blue-reflector dichroic mirror provides a transmission passband having a large ripple from 500 m$\mu$ to 600 m$\mu$ in a longer wavelength range than the design wavelength, while the red-reflector dichroic mirror provides a transmission passband having a large ripple from 500 m$\mu$ to 560 m$\mu$ in a shorter wavelength range than the design wavelength.

SUMMARY OF THE INVENTION

The invention contemplates to eliminate the above-mentioned ripples from the transmission passbands of dichroic mirrors, and accordingly it is an object of the invention to provide dichroic mirrors having improved transmission characteristics.

The above and other objects are achieved by constructing a dichroic thin film coating in which successive layers alternate between a material having a low index of refraction, such as $MgF_2$ and $SiO_2$, and a material having a high index of refraction, such as $ZrO_2$, $CeO_2$, $TiO_2$, ZnS and mixtures thereof vacuum deposited on a transparent substrate, and each of the first and second and highest number layers, counting outwardly from the substrate, is controlled in optical thickness so as to be deviated from an odd number of quarter wavelengths of the design wavelength, while the other layers are deposited to optical thicknesses with a sequence of adjacent layers in the ratio of either $\lambda/4 : 3\lambda/4$, or $\lambda/4 : \lambda/4$, as well known in the art.

Hereinafter the high index used in this specification shall mean 2.0 or higher, while the low index shall mean 1.5 or lower.

Figure 1:
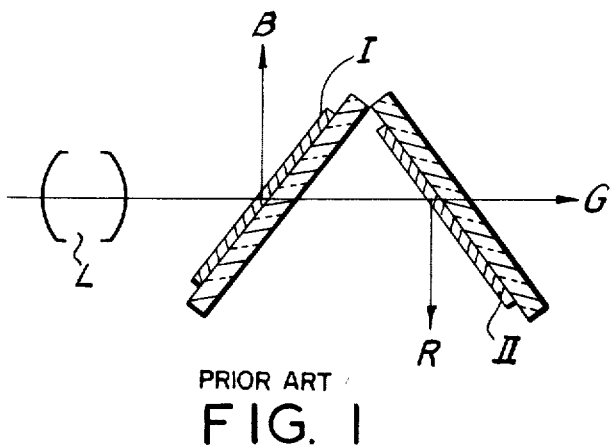
FIG. 1 is a schematic illustration of a color separation optical system which has been known conventionally.
Figure 2:
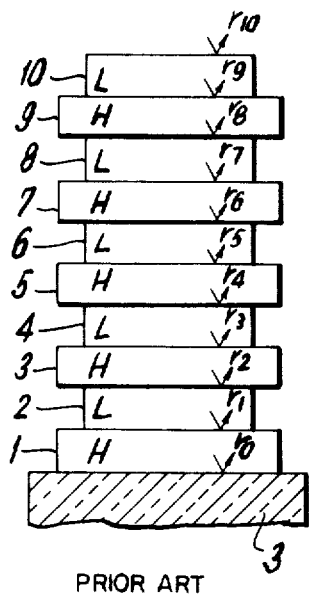
Figure 3:
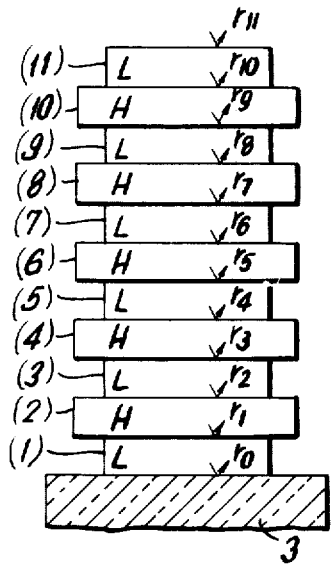

Each of FIG. 2 and FIG. 3 are side elevations of dichroic mirrors.

Figure 4:
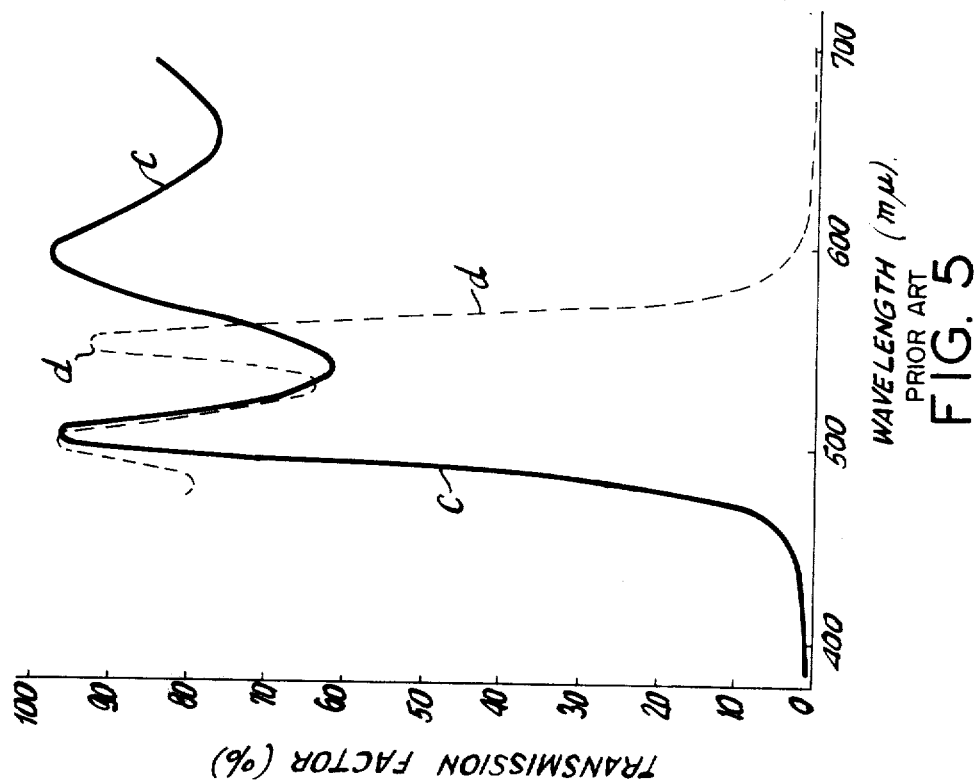
Figure 5:
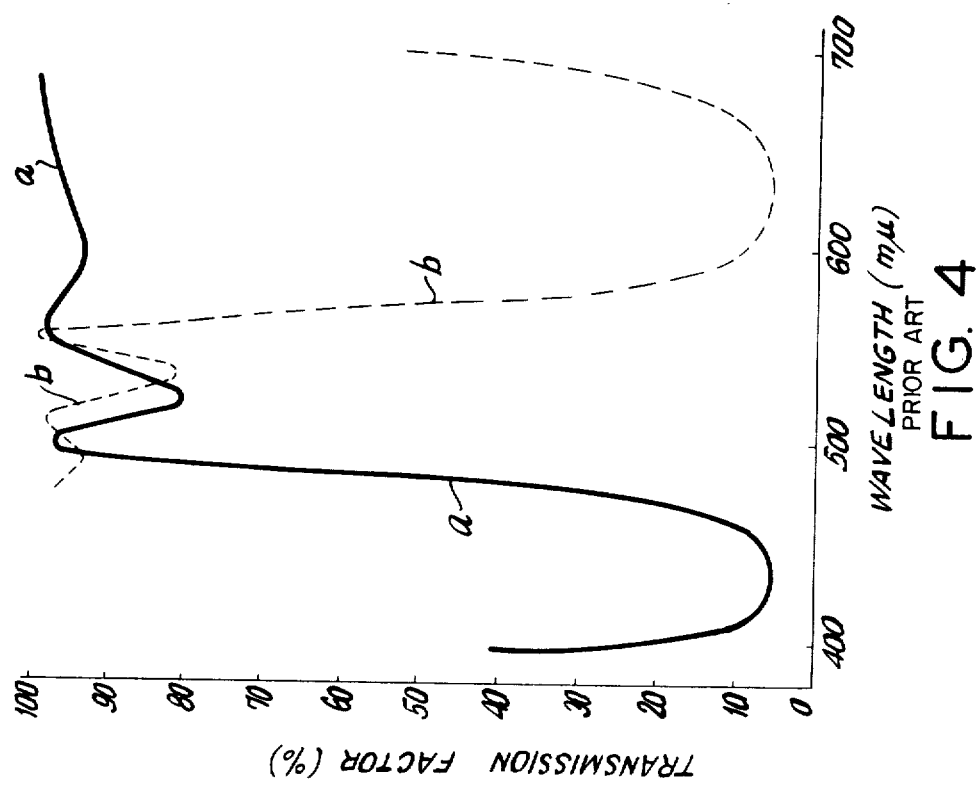

FIG. 4 and FIG. 5 are diagrams each of which shows optical characteristics of a conventionally known dichroic mirror.

Figure 6:
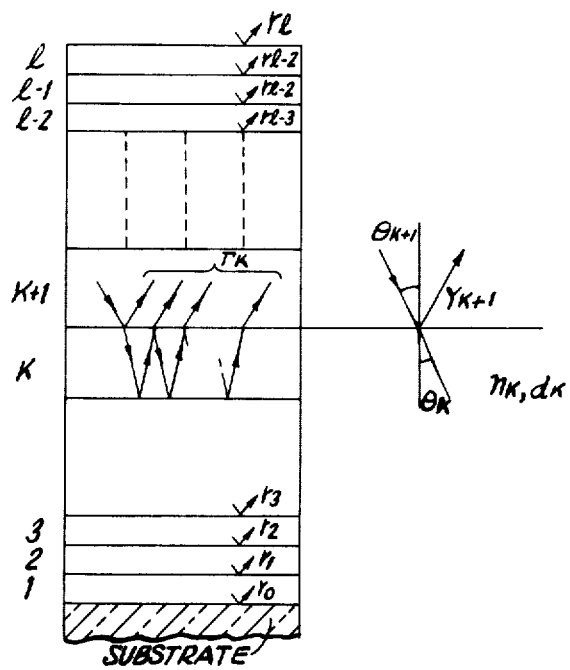
Figure 7:
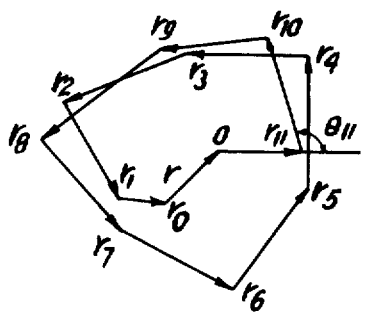

FIG. 6 and FIG. 7 are drawings explaining a principle for preventing ripple.

Figure 8:
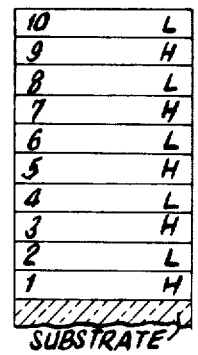
Figure 9:
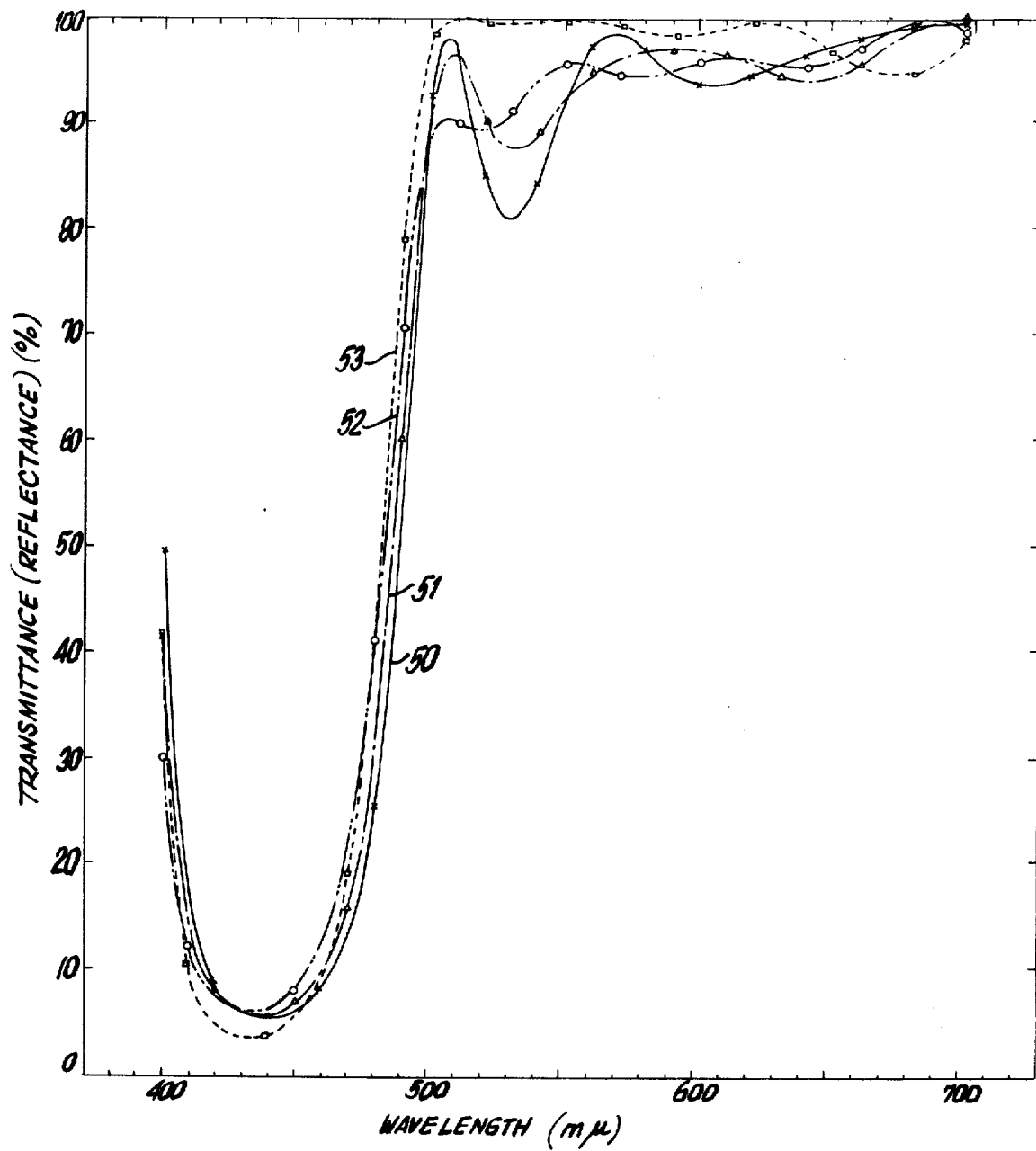

FIG. 8 and FIG. 9 are drawings to showing a process in the present invention.

FIG. 10, FIG. 11, FIG. 12, and FIG. 13 are drawings each of which shows optical characteristics of a respective concrete example of a dichroic mirror of the present invention.

FIG. 14, FIG. 15, FIG. 16, FIG. 17, FIG. 18 and FIG. 19 are drawings each showing optical characteristics of respective modified examples of the present invention.

DETAILED DESCRIPTION OF THE PREFERRED EMBODIMENTS

FIG. 6 and FIG. 7 are drawings showing the computation process used in the present invention. As shown in FIG. 6, $l$ layers of thin films are coated on a substrate and each thin film is numbered consecutively from the substrate as 1, 2, 3, 4 . . . $l$. For a discussion of reflection in a general case, there is now selected the $k$ and $k+1$ layers, and the total reflectance amplitude $\Gamma_k$ of a light beam travelling from the $k+1$ layer to the $k$ layer is defined in terms of reflection coefficient $r_k$ at the boundary between the $k+1$ and $k$ layers, which is generally called "Fresnel coefficient" angle of incidence $\theta_{k+1}$, and angle of refraction $\theta_k$:

$$\Gamma_k = \frac{r_k + \Gamma_{k-1} \cdot e^{-i\delta k}}{1 + r_k \cdot \Gamma_{k-1} \cdot e^{-i\delta k}}$$

wherein $\delta_k$ represents the magnitude of change of the phase by the reflection from the $k$th layer, and is expressed by:

$$\delta_k = (2\pi/\lambda) \cdot 2n_k \cdot d_k \cdot \cos\theta_k$$

wherein $n_k$ and $d_k$ represent the refractive index and thickness of the $k$th layer, respectively, so that the product $n_k d_k$ represents the optical thickness of the $k$th layer. The initial value $\Gamma_o$ is $\Gamma_o = r_o$.

Hence, we have the energy reflectance $R_k$ for the boundary between the $(k=1)$th and $k$th layers defined as $$R_k = \Gamma_k \cdot \Gamma_k^*$$

wherein $\Gamma_k^*$ is a conjugate complex number of $\Gamma_k$, so that the energy reflectance for the outermost layer, i.e., $l$th layer is $$R_l = \Gamma_l \Gamma_l^*$$

And $\Gamma_l$ is as expressed by the following formula:

$$\Gamma_l = \frac{r_l + \Gamma_{l-1} \cdot e^{-i\delta l}}{1 + r_l \Gamma_{l-1} e^{-i\delta l}}$$

Therefore, since $R_l$ can be calculated for each wavelength when the refractive index and thickness of the medium with which the substrate and the thin film in the last layer are in contact are known, if the refractive index and the thickness of the medium are known, the above mentioned $R_l$ is made to be the minimum using the reflective index and film thickness of each layer as parameters so that energy reflection power R approaches zero in a zone in which prevention of ripple is desired. The vector diagram shown in FIG. 7 indicates by vectors the amplitude reflecting power and phase angle at a wavelength such that prevention of ripple is desired, and when calculation is so made that the amplitude reflecting power $r$, synthesized using the film thickness and refractive index of each layer as parameters, approaches zero, the ripple can be prevented.

Based on this calculation procedure, there was prepared a model of a dichroic mirror shown in FIG. 8 as comprising a substrate having an index of refraction of 1.52, and having coated thereon a multilayer thin film composed of 10 layers, of which the odd numbered layers, counting from the substrate, are each of a high index material H having an index of refraction of 2.20 with the layer having an optical thickness of $\frac{3}{4}\lambda_o$ (wherein $\lambda_o$ is the design wavelength in air, in this instance, $\lambda_o = 440$m) and of which the even number layers are each of a low index material L having an index of refraction of 1.38 with the layer having an optical thickness of $\frac{1}{4}\lambda_o$.

At first, a transmittance spectrum of the dichroic mirror model was computed on the assumption that all of the ten layers have the corresponding basic design optical thicknesses, and the result is shown at curve 50 in FIG. 9. As is evident from curve 50, a large ripple band is caused to appear in the vicinity of 530 mμ.

Next, as a first case, the first high index layer $H_1$ adjacent the substrate is selected for employment as the layer which is to be subjected to thickness variation. As far as the first case is concerned, the selection of the layer to be varied in thickness is not confined to the first layer, but any one of the high index layers may be selected for thickness variation to effect equivalent results. Among a plurality of transmittance spectra which could be obtained with this thickness scheme variation, there is shown the optimum spectrum at curve 51 in FIG. 9, and its data in Table 51. As is evident from curve 51, the ripple band is not minimized satisfactorily. It is also found that, instead of selecting one of the high index layers, any one of the low index layers may be selected to effect results similar to the above. In conclusion, so long as the number of layers which are to be varied in thickness is limited to only one, it is impossible to obtain the desired result.

As a second case, in the above-identified 10 layer dichroic mirror model, two layers nearer to the substrate, i.e., the first high index layer $H_1$ and the first low index layer $L_2$ adjacent the layer $H_1$ were varied in thickness. As has already been mentioned, any combination of a high index layer and a low index layer may be selected for thickness variation to effect equivalent results. As far as the second case is concerned, the best result was effected with optical thicknesses of 313.5 mμ for layer $H_1$ and 88 mμ for layer $L_2$. The optimum transmittance spectrum of the thus modified dichroic mirror model is shown at curve 52 in FIG. 9, and the data are given in Table 52. As is evident from curve 52, the ripple is not yet reduced to a satisfactory level.

As a third case, in the 10 layer dichroic mirror model, three layers identified as the 1st, 2nd and 10th layers $H_1$, $L_2$ and $L_{10}$ were varied in thickness. The best result was obtained with optical thicknesses of 313.5 mμ for $H_1$, 88 mμ for $L_2$ and 176 mμ for $L_{10}$. This optimized transmittance variation with wavelength is illustrated at curve 101 FIG. 10. As is evident from curve 101, the desired result for a dichroic mirror with satisfactorily minimized ripples was obtained for the first time in this third case.

Table 51

Curve 51 (FIG. 9)$\lambda_o = 440$ mμ

| Layer | Design | Thickness (mμ) |
|---|---|---|
| Medium | Air | |

Table 51-continued

Curve 51 (FIG. 9)λ₀ = 440 mµ

| Layer | Design | Thickness (mµ) |
|---|---|---|
| 10 | L | 110 |
| 9 | 3H | 330 |
| 8 | L | 110 |
| 7 | 3H | 330 |
| 6 | L | 110 |
| 5 | 3H | 330 |
| 4 | L | 110 |
| 3 | 3H | 330 |
| 2 | L | 110 |
| 1 | 2.80H | 308 |
| G | | |

Table 52

Curve 52 (FIG. 9) λ₀ = 440 mµ

| Layer | Design | Thickness (mµ) |
|---|---|---|
| Medium | Air | |
| 10 | L | 110 |
| 9 | 3H | 330 |
| 8 | L | 110 |
| 7 | 3H | 330 |
| 6 | L | 110 |
| 5 | 3H | 330 |
| 4 | L | 110 |
| 3 | 3H | 330 |
| 2 | 0.8L | 88.0 |
| 1 | 2.85H | 313.5 |
| G | | |

Table 53

Curve 53 (FIG. 9) λ₀ = 440 mµ

| Layer | Design | Thickness (mµ) |
|---|---|---|
| Medium | Air | |
| 10 | 1.6L | 176 |
| 9 | 3H | 330 |
| 8 | L | 110 |
| 7 | 3H | 330 |
| 6 | L | 110 |
| 5 | 3H | 330 |
| 4 | L | 110 |
| 3 | 3H | 330 |
| 2 | 0.8L | 88.0 |
| 1 | 2.85H | 313.5 |
| G | | |

While in the above description the variation in the film thickness in limited to three layers, satisfactory results can be obtained practically even when four layers or more are varied according to an integral ratio. What is shown by 53 in FIG. 9 is a curve for the optimum transmittivity when the four layers, i.e., first layer $H_1$, the second $L_2$, the third layer $H_3$ and the last layer $L_{10}$ in a dichroic mirror with 10 layer films shown in FIG. 8 are varied. The optimum film thicknesses of the layers being varied then will be 313.5 mµ for $H_1$, 88 mµ for $L_2$, 341 mµ for $H_3$, and 176 mµ for $L_{10}$.

Figure 10:
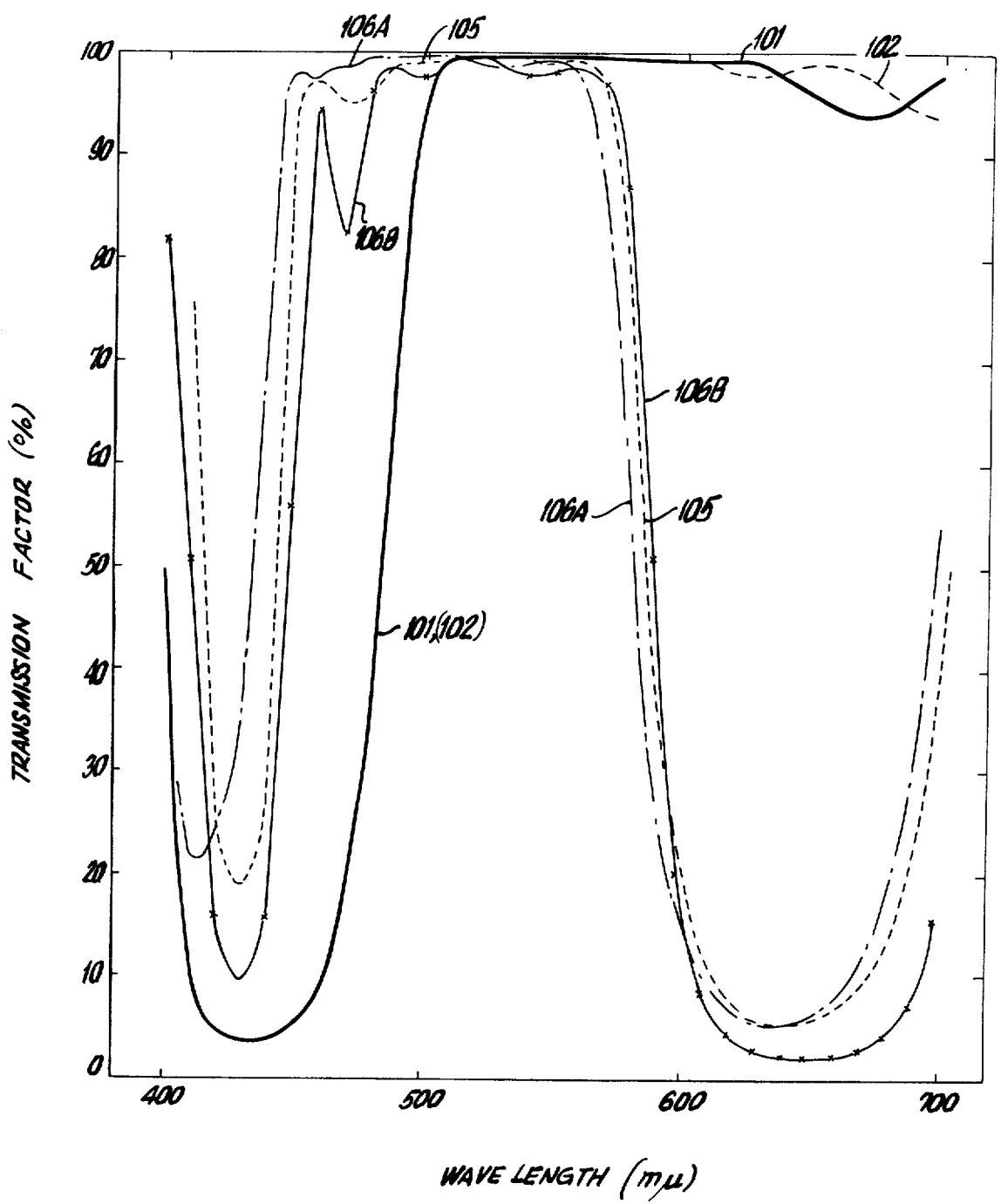

The transmittivity characteristics curve of 53 in FIG. 9 differs only slightly from curve 101 in FIG. 10. Therefore, the effect obtained when three layers are varied and the effect obtained when four layers are varied are almost the same. Thus the transmittivity characteristics curve obtained by varying film thickness of three layers has an almost perfect effect in eliminating ripple. Therefore it is not needed to have the film thicknesses of a larger number of layers varied for improvement of ripple, and from the production point of view, as an increase in the number of thin film layers makes the manufacturing process difficult, the invention is limited to the three layers, in which film thickness is varied.

Concerning the three layers of film which are to be varied, any layers of high refractive index layers or low refractive index layers forming multi-layer films may be varied, but in view of production difficulty it is desired to have the first layer, the second layer and the last layer counting from the substrate varied.

As apparent from the approach in the present invention, in the alternate combination of high refractive index layer and low refractive index layers, whether the last layer is a high refractive index layer or a low refractive index layer is an important consideration. For example, when satisfactory transmittivity characteristics are obtained by using high refractive index material in last layer, if the last layer is replaced with low refractive index material with the same routine (layer structure), then similar satisfactory transmittivity characteristics can not necessarily be obtained.

Now, examples of the present invention will be explained.

A dichroic mirror having a multilayer coating in which the layers are made up of a material having a high index of refraction H and a material having a low index of refraction L vacuum deposited on a transparent substrate in this order, the first layer adjacent the substrate being made of high index material and having an optical thickness of three quarters the wavelength of a design wavelength λ in air and the outermost layer being made of low index material and having an optical thickness of one quarter the design wavelength λ, will be described hereinafter by using standard thin film notation:

$$G(3HL)^mA$$

wherein

G is a glass substrate

H is a layer of high index material having an optical thickness of 3λ/4

L is a layer of low index material having an optical thickness of λ/4 m is an integer but never zero; and

A is ambient (air).

In order to eliminate a ripple in a longer wavelength range than a design wavelength, (1) a dichroic multilayered structure with the design formula G(3HL)$^m$A should be modified so that the optical thickness of the first layer is less than 3λ/4, the optical thickness of the second layer is less than λ/4, and the optical thickness of the outermost layer is greater and λ/4. (2) A structure with the design formula G(3HL)$^m$3HA should be modified to contain a first layer, deposited on a substrate, less than 3λ/4 in optical thickness, a second layer less than λ/4 in optical thickness and the outermost layer less than 3λ/4 in optical thickness. (3) A structure with the design formula G(HL)$^m$A should be modified to contain first and second layers each thinner than λ/4, and an outermost layer thicker than λ4. (4) A structure with the design formula G(HL)$^m$HA should be modified to contain first, second and outermost layers each thinner than λ/4.

In order to eliminate a ripple in a shorter wavelength range than a design wavelength, (5) a structure with the design formula G(3HL)$^m$A should be modified to contain a first layer thicker than 3λ/4, a second layer thicker than λ/4 and an outermost layer thinner than λ/4. (6) A structure with the design formula G(3HL)$^m$3HA should be modified to contain either a combination (a) of a first layer thinner than 3λ/4, a second layer thicker than λ/4 and an outermost layer thinner than 3λ/4, or a combination (b) of a first layer thicker than 3λ/4, a second layer thicker than λ/4 and an outermost layer thicker than 3λ/4. (7) A structure with the design formula G(HL)$^m$A should be modified to contain first and second layers each thicker than λ/4 and an outermost layer thinner than λ/4. (8) A structure with the design formula G(HL)$^m$HA should be modified to contain first, second and outermost layers each thicker than λ4.

Figure 11:
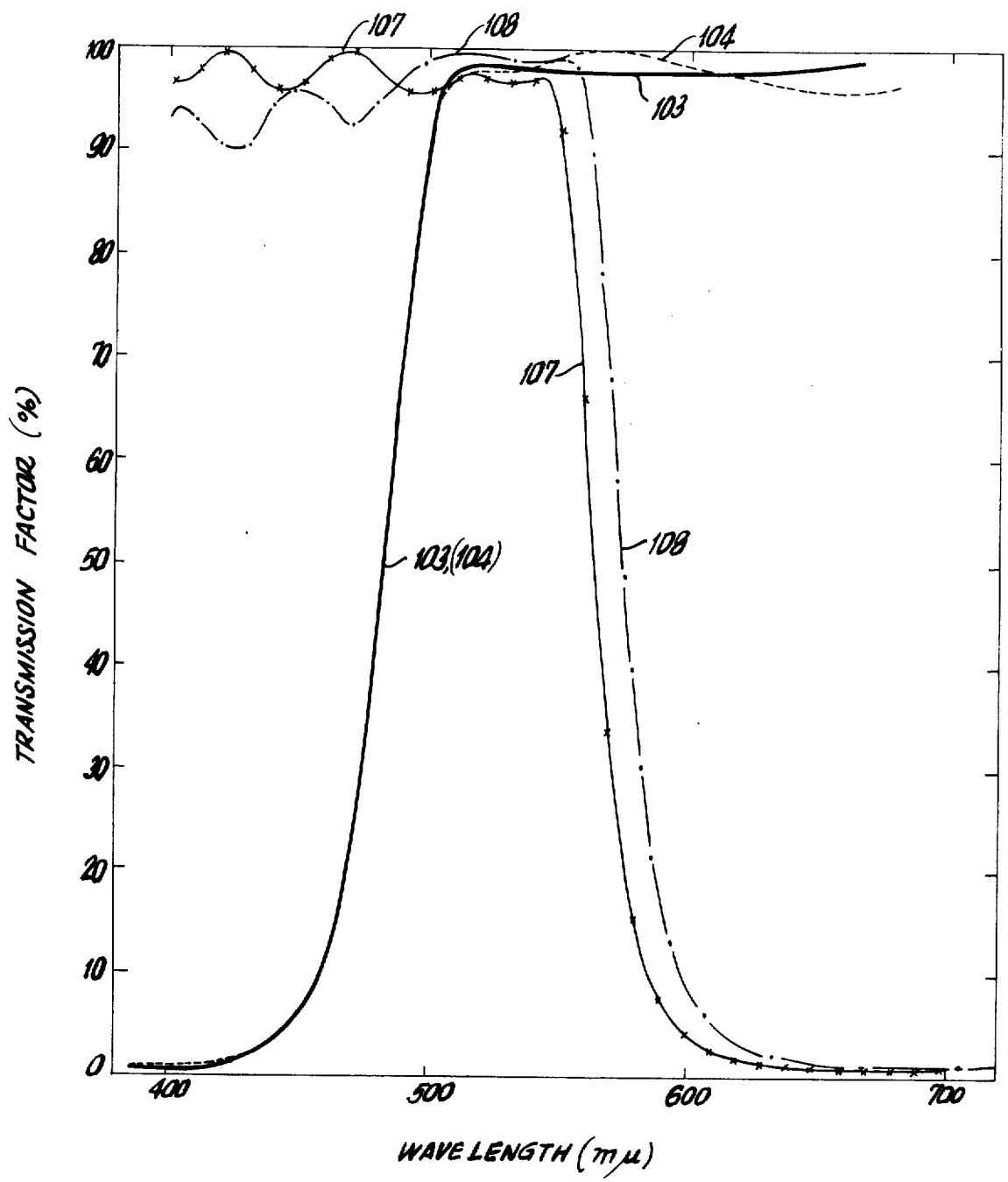

FIG. 10 and FIG. 11 are drawings showing examples based on the above mentioned patterns (1) to (8), and the curve 101 in FIG. 10 shows a blue-reflector dichroic mirror with 10 film layers according to the pattern (1), the curve 102 shows a blue-reflector dichoric mirror with 11 film layers based on the pattern (2), the curve 105 shows a red-reflector dichroic mirror with 10 film layers based on the pattern (5), the curve 106-A shows a red-reflector dichroic mirror with 11 film layers based on the pattern (6-a), and the curve 106-b shows a red-reflector dichroic mirror with 11 film layers based on the pattern (6-b).

The curve 103 of FIG. 11 shows a blue-reflector dichroic mirror with 14 film layers based on the pattern (3), the curve 104 shows a blue-reflector dichroic mirror with 15 film layers based on the pattern (4), the curve 107 shows a red-reflector dichroic mirror with 14 film layers based on the pattern (7), and the curve 108 shows a red-reflector dichroic mirror with 13 layers based on the pattern (8).

Detailed data of the curves 101 to 108 are shown in Tables 101 to 108.

In the following tables,

H represents λ$_o$/4 optical thickness of index 2.20
L represents λ$_o$/4 optical thickness of index 1.38
G represents a substrate of index 1.52 wherein λ$_o$ represents a design wavelength in air.

Table 101

Curve 101 (FIG. 10) λ$_o$ = 440 mμ

| Layer | Design | Thickness (mμ) |
|---|---|---|
| Medium | Air of index 1.00 | |
| 10 | 1.6L | 176 |
| 9 | 3H | 330 |
| 8 | L | 110 |
| 7 | 3H | 330 |
| 6 | L | 110 |
| 5 | 3H | 330 |
| 4 | L | 110 |
| 3 | 3H | 330 |
| 2 | 0.8L | 88 |
| 1 | 2.85H | 313.5 |
| G | | |

Table 102

Curve 102 (FIG. 10) λ$_o$ = 440 mμ

| Layer | Design | Thickness (mμ) |
|---|---|---|
| Medium | Joiner of index 1.52 | |
| 11 | 2.7H | 297 |
| 10 | L | 110 |
| 9 | 3H | 330 |
| 8 | L | 110 |
| 7 | 3H | 330 |
| 6 | L | 110 |
| 5 | 3H | 330 |
| 4 | L | 110 |
| 3 | 3H | 330 |
| 2 | 0.8L | 88 |
| 1 | 2.8H | 308 |
| G | | |

Table 103

Curve 103 (FIG. 11) λ$_o$ = 410 mμ

| Layer | Design | Thickness (mμ) |
|---|---|---|
| Medium | Air | |
| 14 | 1.9L | 194.8 |
| 13 | H | 102.5 |
| 12 | L | 102.5 |
| 11 | H | 102.5 |
| 10 | L | 102.5 |

Table 103-continued

Curve 103 (FIG. 11) λ$_o$ = 410 mμ

| Layer | Design | Thickness (mμ) |
|---|---|---|
| 9 | H | 102.5 |
| 8 | L | 102.5 |
| 7 | H | 102.5 |
| 6 | L | 102.5 |
| 5 | H | 102.5 |
| 4 | L | 102.5 |
| 3 | H | 102.5 |
| 2 | 0.8L | 82.0 |
| 1 | 0.6H | 61.5 |
| G | | |

Table 104

Curve 104 (FIG. 11) λ$_o$ = 410 mμ

| Layer | Design | Thickness (mμ) |
|---|---|---|
| Medium | Air | |
| 15 | 0.5H | 51.3 |
| 14 | L | 102.5 |
| 13 | H | 102.5 |
| 12 | L | 102.5 |
| 11 | H | 102.5 |
| 10 | L | 102.5 |
| 9 | H | 102.5 |
| 8 | L | 102.5 |
| 7 | H | 102.5 |
| 6 | L | 102.5 |
| 5 | H | 102.5 |
| 4 | L | 102.5 |
| 3 | H | 102.5 |
| 2 | 0.8L | 82.0 |
| 1 | 0.6H | 61.5 |
| G | | |

Table 105

Curve 105 (FIG. 10) λ$_o$ = 640 mμ

| Layer | Design | Thickness (mμ) |
|---|---|---|
| Medium | Air of index 1.00 | |
| 10 | 0.6L | 96 |
| 9 | 3H | 480 |
| 8 | L | 160 |
| 7 | 3H | 480 |
| 6 | L | 160 |
| 5 | 3H | 480 |
| 4 | L | 160 |
| 3 | 3H | 480 |
| 2 | 1.1L | 176 |
| 1 | 3.1H | 496 |
| G | | |

Table 106-(A)

Curve 106-A (FIG. 10) λ$_o$ = 630 mμ

| Layer | Design | Thickness (mμ) |
|---|---|---|
| Medium | Joiner of index 1.52 | |
| 11 | 1.5H | 236.3 |
| 10 | L | 157.5 |
| 9 | 3H | 472.5 |
| 8 | L | 157.5 |
| 7 | 3H | 472.5 |
| 6 | L | 157.5 |
| 5 | 3H | 472.5 |
| 4 | L | 157.5 |
| 3 | 3H | 472.5 |
| 2 | 1.2L | 189 |
| 1 | 1.6H | 252 |
| G | | |

Table 106-B

Curve 106-B (FIG. 10) λ$_o$ = 640 mμ

| Layer | Design | Thickness (mμ) |
|---|---|---|
| Medium | Joiner of index 1.54 | |
| 11 | 3.15H | 504 |
| 10 | L | 160 |
| 9 | 3H | 480 |
| 8 | L | 160 |
| 7 | 3H | 480 |
| 6 | L | 160 |
| 5 | 3H | 480 |
| 4 | L | 160 |
| 3 | 3H | 480 |
| 2 | 1.2L | 192 |

Table 106-B-continued

| Curve 106-B (FIG. 10) $\lambda_o = 640$ m$\mu$ | | |
|---|---|---|
| Layer | Design | Thickness (m$\mu$) |
| 1 | 3.2H | 512 |
| G | | |

Table 107

| Curve 107 (Fig. 11) $\lambda_o = 660$ m$\mu$ | | |
|---|---|---|
| Layer | Design | Thickness (m$\mu$) |
| Medium | Air | |
| 14 | 0.6L | 99 |
| 13 | H | 165 |
| 12 | L | 165 |
| 11 | H | 165 |
| 10 | L | 165 |
| 9 | H | 165 |
| 8 | L | 165 |
| 7 | H | 165 |
| 6 | L | 165 |
| 5 | H | 165 |
| 4 | L | 165 |
| 3 | H | 165 |
| 2 | 1.15L | 190 |
| 1 | 1.2H | 198 |
| G | | |

Table 108

| Curve 108 (FIG. 11) $\lambda_o = 660$ m$\mu$ | | |
|---|---|---|
| Layer | Design | Thickness (m$\mu$) |
| Medium | Joiner of index 1.52 | |
| 13 | 1.3H | 214.5 |
| 12 | L | 165 |
| 11 | H | 165 |
| 10 | L | 165 |
| 9 | H | 165 |
| 8 | L | 165 |
| 7 | H | 165 |
| 6 | L | 165 |
| 5 | H | 165 |
| 4 | L | 165 |
| 3 | H | 165 |
| 2 | 1.1L | 181.5 |
| 1 | 1.25H | 206.6 |
| G | | |

The invention in another aspect is concerned with dichroic multilayered structures different in the order of the layers from those show in the above. In order to effect complete elimination of a ripple in a longer wavelength range than the design wavelength $\lambda$, (9) a dichroic multilayered structure with the design formula G(L3H)$^m$A should be modified ton contain a first layer deposited on a substrate less than $\lambda/4$ in optical thickness, a second layer less than $3\lambda/4$ in optical thickness and an outermost layer less than $3\lambda/4$ in optical thickness. (10) A structure with the design formula G(L3H)$^m$LA should be modified to contain a first layer thinner than $\lambda/4$, a second layer thinner than $3\lambda/4$ and an outermost layer thicker than $\lambda/4$. (11) A structure with the design formula G(LH)$^m$A should be modified to contain first, second and outermost layers, each thinner than $\lambda/4$. (12) A structure with design formula G(LH)$^m$LA should be modified to contain first and second layers each thinner than $\lambda/4$, and an outermost layer thicker than $\lambda/4$.

In order to effect complete elimination of a ripple in a shorter wavelength range than the design wavelength. (13) A structure with the design formula G(L3H)$^m$A should be modified to contain either a combination (A) of a first layer thicker than $\lambda/4$, and second and outermost layers each thinner than $3\lambda/4$, or a combination (b) of a first layer thicker than $\lambda/4$, and second and outermost layers each thicker than $3\lambda4$. (14) A structure with design formula G(L3H)$^m$LA should be modified to contain a first layer thicker than $\lambda/4$, a second layer thicker than $3\lambda/4$ and an outermost layer thinner than $\lambda/4$. (15) A structure with the design formula G(LH)$^m$A should be modified to contain first, second and outermost layers each thicker than $\lambda/4$. (16) A structure with the design formula G(LH)$^m$LA should be modified to contain first and second layers each thicker than $\lambda/4$ and an outermost layer thinner than $\lambda/4$.

Figure 12:
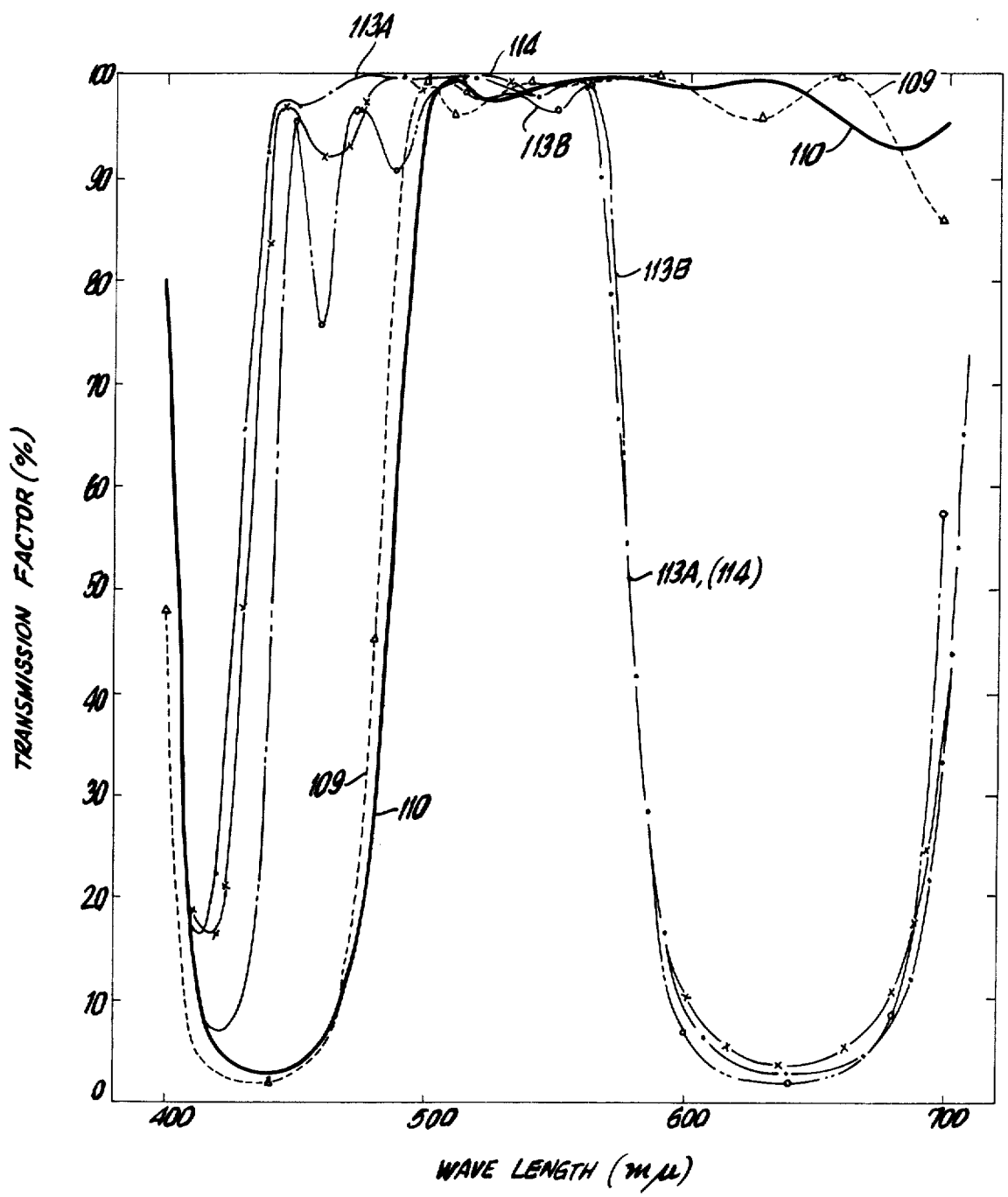
Figure 13:
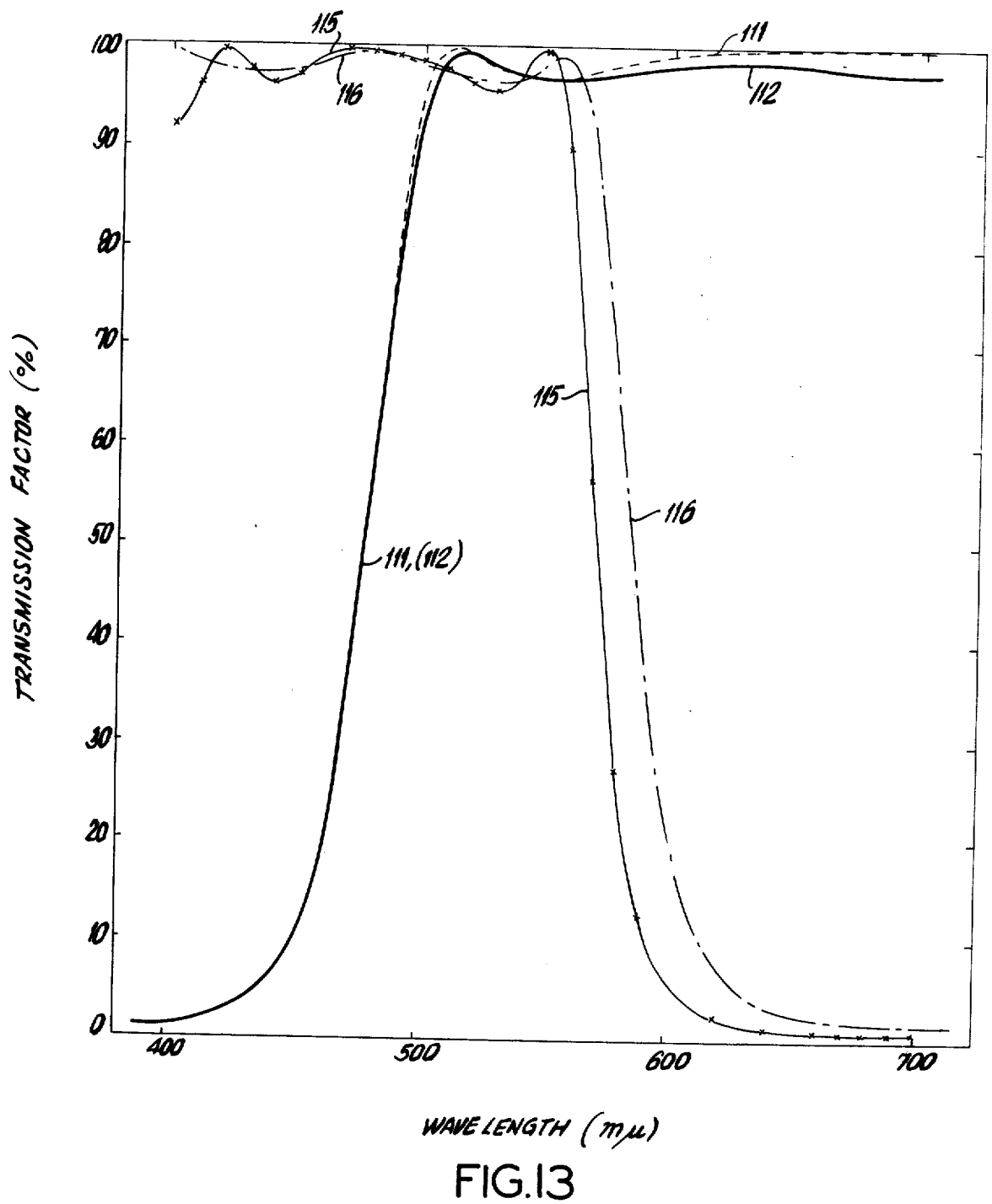

FIG. 12 and FIG. 13 are drawings showing examples based on the above mentioned patterns (9) to (16). The curve 109 in FIG. 12 shows a blue-reflector dichroic mirror with 12 film layers based on the pattern (9), the curve 110 shows a blue-reflector dichroic mirror with 11 film layers based on the pattern (10), the curve 113-A shows a red-reflector dichroic mirror with 12 film layers based on the pattern (13-a), the curve 113-B shows a red-reflector dechroic mirror with 12 film layers based on the pattern (13-b), and the curve 114 shows a red-reflector dichroic mirror with 11 film layers based on the pattern (14).

The curve 111 of FIG. 13 shows a blue-reflector dichroic mirror with 14 film layers based on the pattern (11), the curve 112 shows a blue-reflector dichroic mirror with 13 film layers based on the pattern (12), the curve 115 shows a red-reflector dichroic mirror with 14 film layers based on the pattern (15), and the curve 116 shows a red-reflector dichroic mirror with 13 film layers based on the pattern (16).

Detailed data of the curves 109 to the 116 are shown in Tables 109 to 116.

In the following tables,

H represents $\lambda_o/4$ optical thickness of index 2.20

L represents $\lambda_o/4$ optical thickness of index 1.38

G represents a substrate of index 1.52 wherein $\lambda_o$ represents a design wavelength.

Table 109

| Curve 109 (FIG. 12) $\lambda_o = 440$ m$\mu$ | | |
|---|---|---|
| Layer | Design | Thickness (m$\mu$) |
| Medium | Joiner of index 1.54 | |
| 12 | 2.7H | 297 |
| 11 | L | 110 |
| 10 | 3H | 330 |
| 9 | L | 110 |
| 8 | 3H | 330 |
| 7 | L | 110 |
| 6 | 3H | 330 |
| 5 | L | 110 |
| 4 | 3H | 330 |
| 3 | L | 110 |
| 2 | 2.8H | 308 |
| 1 | 0.6L | 66 |
| G | | |

Table 110

| Curve 110 (FIG. 12) $\lambda_o = 440$ m$\mu$ | | |
|---|---|---|
| Layer | Design | Thickness (m$\mu$) |
| Medium | Air | |
| 11 | 1.6L | 176 |
| 10 | 3H | 330 |
| 9 | L | 110 |
| 8 | 3H | 330 |
| 7 | L | 110 |
| 6 | 3H | 330 |
| 5 | L | 110 |
| 4 | 3H | 330 |
| 3 | L | 110 |
| 2 | 2.9H | 319 |
| 1 | 0.6L | 66 |
| G | | |

Table 111

| Curve 111 (FIG. 13) $\lambda = 400$ m$\mu$ | | |
|---|---|---|
| Layer | Design | Thickness (m$\mu$) |
| Medium | Joiner of index 1.52 | |
| 14 | 0.5H | 50 |

Table 111-continued

Curve 111 (FIG. 13) λ = 400 mμ

| Layer | Design | Thickness (mμ) |
|---|---|---|
| 13 | L | 100 |
| 12 | H | 100 |
| 11 | L | 100 |
| 10 | H | 100 |
| 9 | L | 100 |
| 8 | H | 100 |
| 7 | L | 100 |
| 6 | H | 100 |
| 5 | L | 100 |
| 4 | H | 100 |
| 3 | L | 100 |
| 2 | 0.6H | 60 |
| 1 | 0.6L | 60 |
| G | | |

Table 112

Curve 112 (FIG. 13) $\lambda_o$ = 420 mμ

| Layer | Design | Thickness (mμ) |
|---|---|---|
| Medium | Air | |
| 13 | 1.8L | 189 |
| 12 | H | 105 |
| 11 | L | 105 |
| 10 | H | 105 |
| 9 | L | 105 |
| 8 | H | 105 |
| 7 | L | 105 |
| 6 | H | 105 |
| 5 | L | 105 |
| 4 | H | 105 |
| 3 | L | 105 |
| 2 | 0.6H | 63 |
| 1 | 0.6L | 63 |
| G | | |

Table 113-A

Curve 113-A (FIG. 12) $\lambda_o$ = 630 mμ

| Layer | Design | Thickness (mμ) |
|---|---|---|
| Medium | Joiner of index 1.52 | |
| 12 | 1.5H | 236.3 |
| 11 | L | 157.5 |
| 10 | 3H | 472.5 |
| 9 | L | 157.5 |
| 8 | 3H | 472.5 |
| 7 | L | 157.5 |
| 6 | 3H | 472.5 |
| 5 | L | 157.5 |
| 4 | 3H | 472.5 |
| 3 | L | 157.5 |
| 2 | 1.5H | 236.3 |
| 1 | 1.3L | 204.8 |
| G | | |

Table 113-B

Curve 113-B (FIG. 12) $\lambda_o$ = 630 mμ

| Layer | Design | Thickness (mμ) |
|---|---|---|
| Medium | Joiner of index 1.54 | |
| 12 | 3.3H | 519.8 |
| 11 | L | 157.5 |
| 10 | 3H | 472.5 |
| 9 | L | 157.5 |
| 8 | 3H | 472.5 |
| 7 | L | 157.5 |
| 6 | 3H | 472.5 |
| 5 | L | 157.5 |
| 4 | 3H | 472.5 |
| 3 | L | 157.5 |
| 2 | 3.15H | 496 |
| 1 | 1.3L | 205 |
| G | | |

Table 114

Curve 114 (FIG. 12) $\lambda_o$ = 630 mμ

| Layer | Design | Thickness (mμ) |
|---|---|---|
| Medium | Air | |
| 11 | 0.6L | 94.5 |
| 10 | 3H | 472.5 |
| 9 | L | 157.5 |
| 8 | 3H | 472.5 |
| 7 | L | 157.5 |

Table 114-continued

Curve 114 (FIG. 12) $\lambda_o$ = 630 mμ

| Layer | Design | Thickness (mμ) |
|---|---|---|
| 6 | 3H | 472.5 |
| 5 | L | 157.5 |
| 4 | 3H | 472.5 |
| 3 | L | 157.5 |
| 2 | 3.1H | 488.3 |
| 1 | 1.2L | 189 |
| G | | |

Table 115

Curve 115 (Additional FIG. 13) $\lambda_o$ = 670 mμ

| Layer | Design | Thickness (mμ) |
|---|---|---|
| Medium | Joiner of index 1.54 | |
| 14 | 1.3H | 317.8 |
| 13 | L | 167.5 |
| 12 | H | 167.5 |
| 11 | L | 167.5 |
| 10 | H | 167.5 |
| 9 | L | 167.5 |
| 8 | H | 167.5 |
| 7 | L | 167.5 |
| 6 | H | 167.5 |
| 5 | L | 167.5 |
| 4 | H | 167.5 |
| 3 | L | 167.5 |
| 2 | 1.25H | 209 |
| 1 | 1.3L | 217.8 |
| G | | |

Table 116

Curve 116 (FIG. 13) $\lambda_o$ = 670 mμ

| Layer | Design | Thickness (mμ) |
|---|---|---|
| Medium | Air | |
| 13 | 0.6L | 100.5 |
| 12 | H | 167.5 |
| 11 | L | 167.5 |
| 10 | H | 167.5 |
| 9 | L | 167.5 |
| 8 | H | 167.5 |
| 7 | L | 167.5 |
| 6 | H | 167.5 |
| 5 | L | 167.5 |
| 4 | H | 167.5 |
| 3 | L | 167.5 |
| 2 | 1.25H | 209.7 |
| 1 | 1.3L | 217.8 |

The film thickness in each example shown in the above mentioned Table 101 to Table 116 is of such magnitude as exhibiting the best transmittivity characteristics. Therefore, the film thicknesses shown in Table 101 to Table 116 are the optimum values. But, in the above mentioned examples when the film thickness of the layers receiving variation is within a range of about $\pm 0.15 \times (\lambda_o/4)$ of the above mentioned optimum value (wherein $\lambda_o$ is the design wavelength), ripple can be held satisfactorily small. That is when the optimum film thickness at the first layer is expressed by $l_1$, the optimum film thickness at the second layer is represented by $l_2$, and the optimum thickness at the last layer is represented by $l_3$, if the film thicknesses $\lambda_1$, $\lambda_2$, and $\lambda_3$ are within the range of:

$$\lambda_1 - 0.15 \times (\lambda_o/4) < l_1 < \lambda_1 + 0.15 \times (\lambda_o/4)$$

$$\lambda_2 - 0.15 \times (\lambda_o/4) < l_2 < \lambda_2 + 0.15 \times (\lambda_o/4)$$

$$\lambda_3 - 0.15 \times (\lambda_o/4) < l_3 < \lambda_3 + 0.15 \times (\lambda_o/4),$$

they can be used as dichroic mirrors in which ripple is virtually eliminated.

For making this clear, the examples of Tables 101, 103, 106A, 108, 112 and 114, selected at random out of the above mentioned examples, will be shown.

Figure 14:
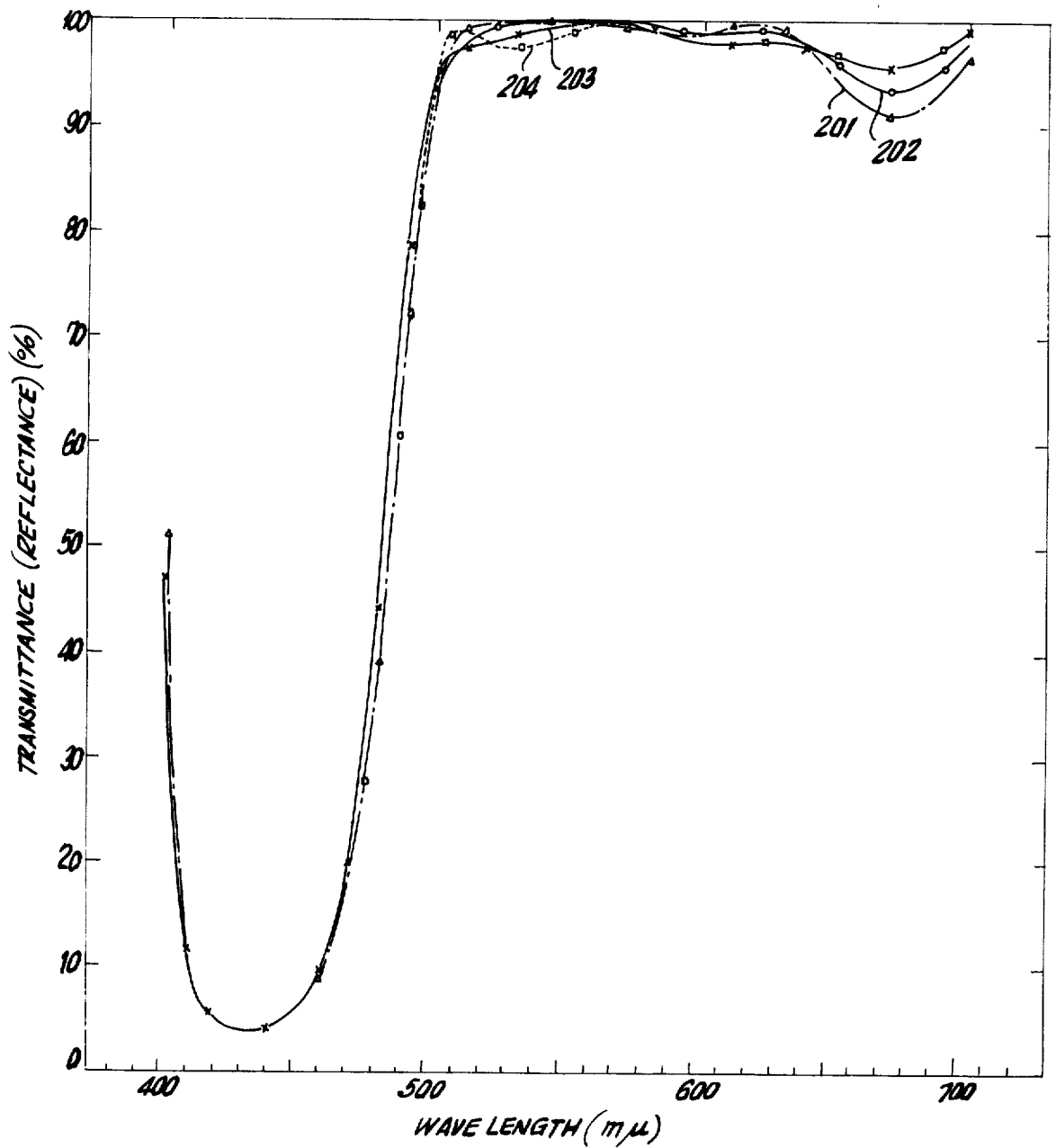
Figure 15:
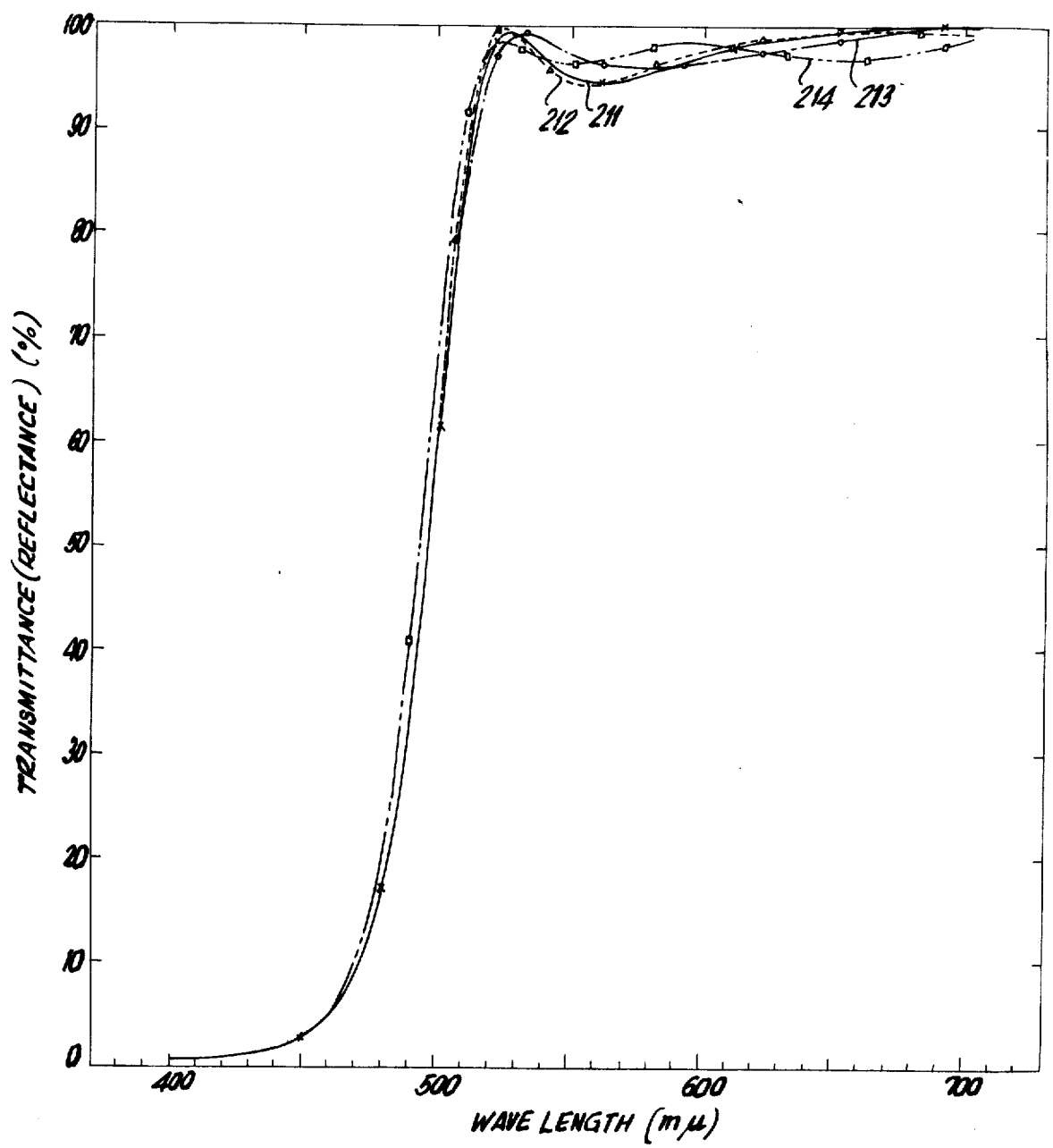
Figure 16:
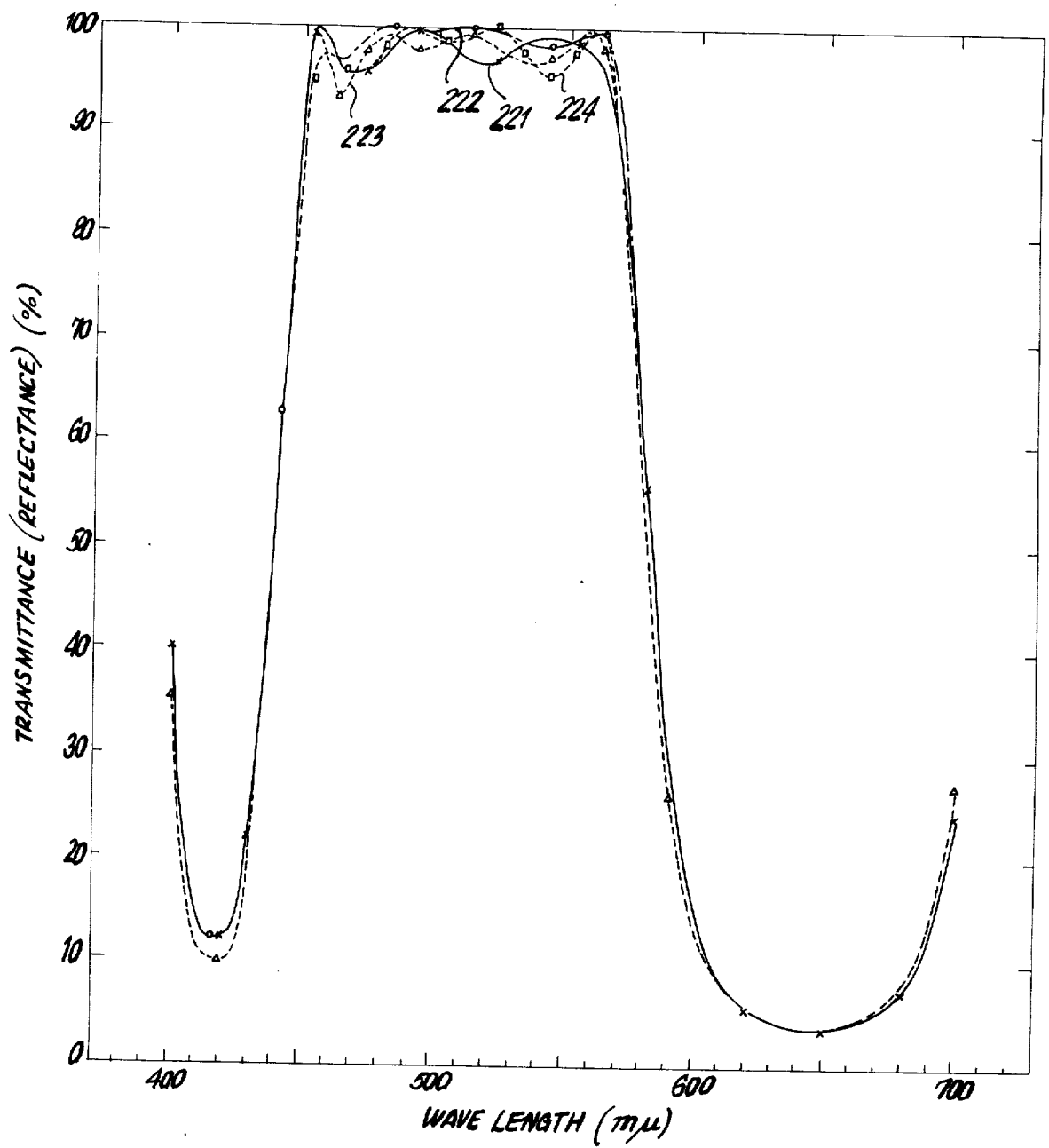
Figure 17:
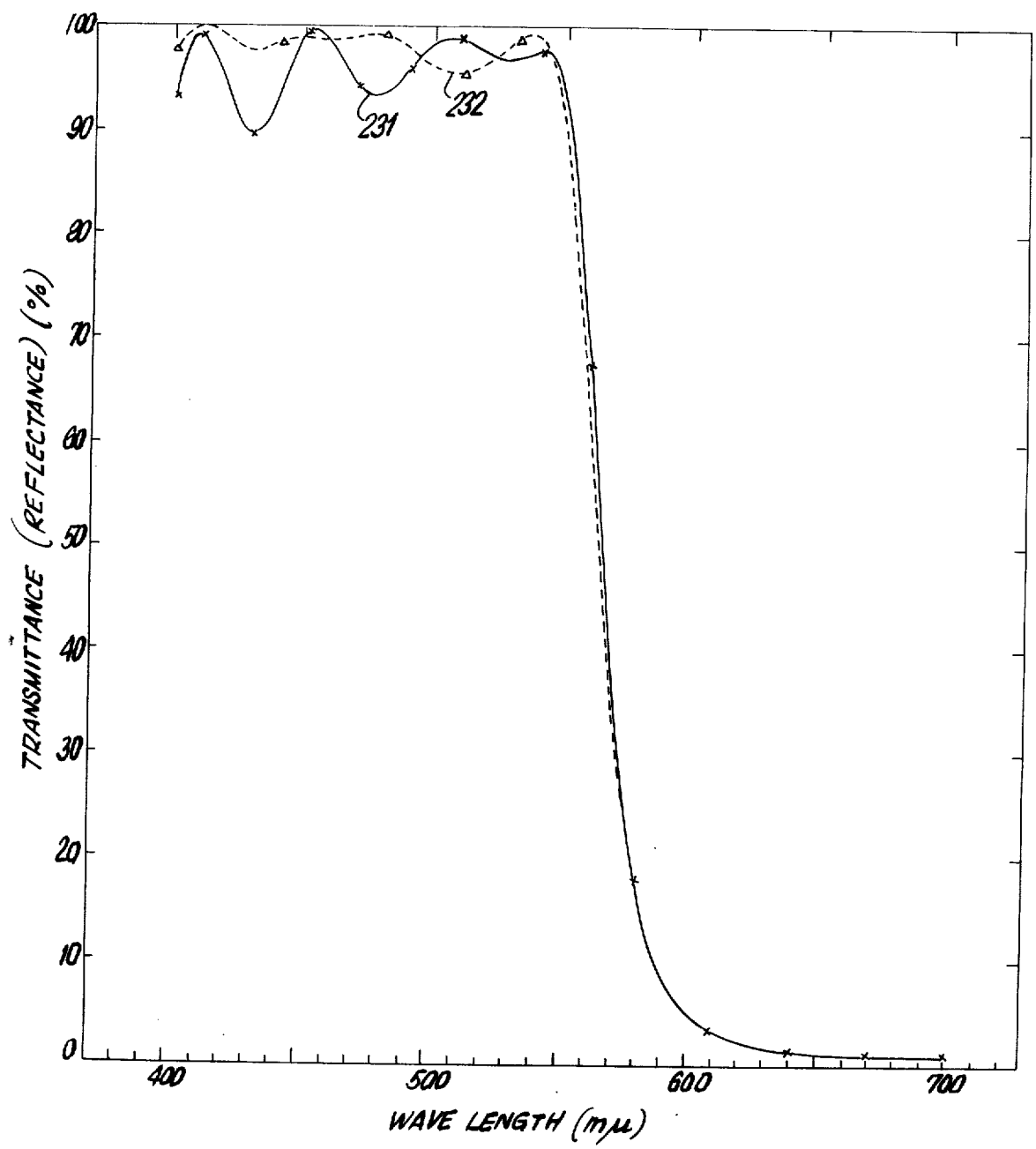
Figure 18:
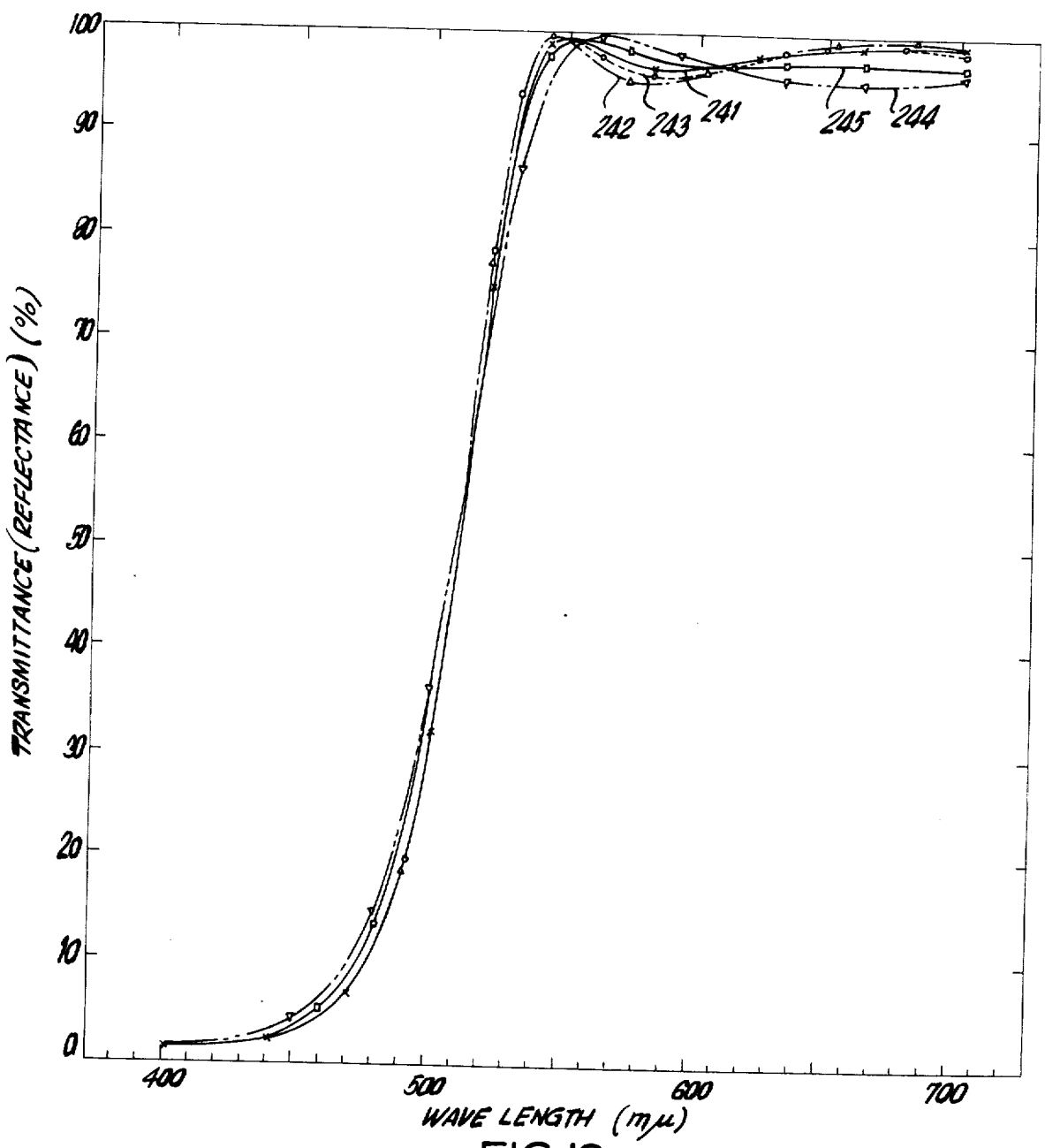
Figure 19:
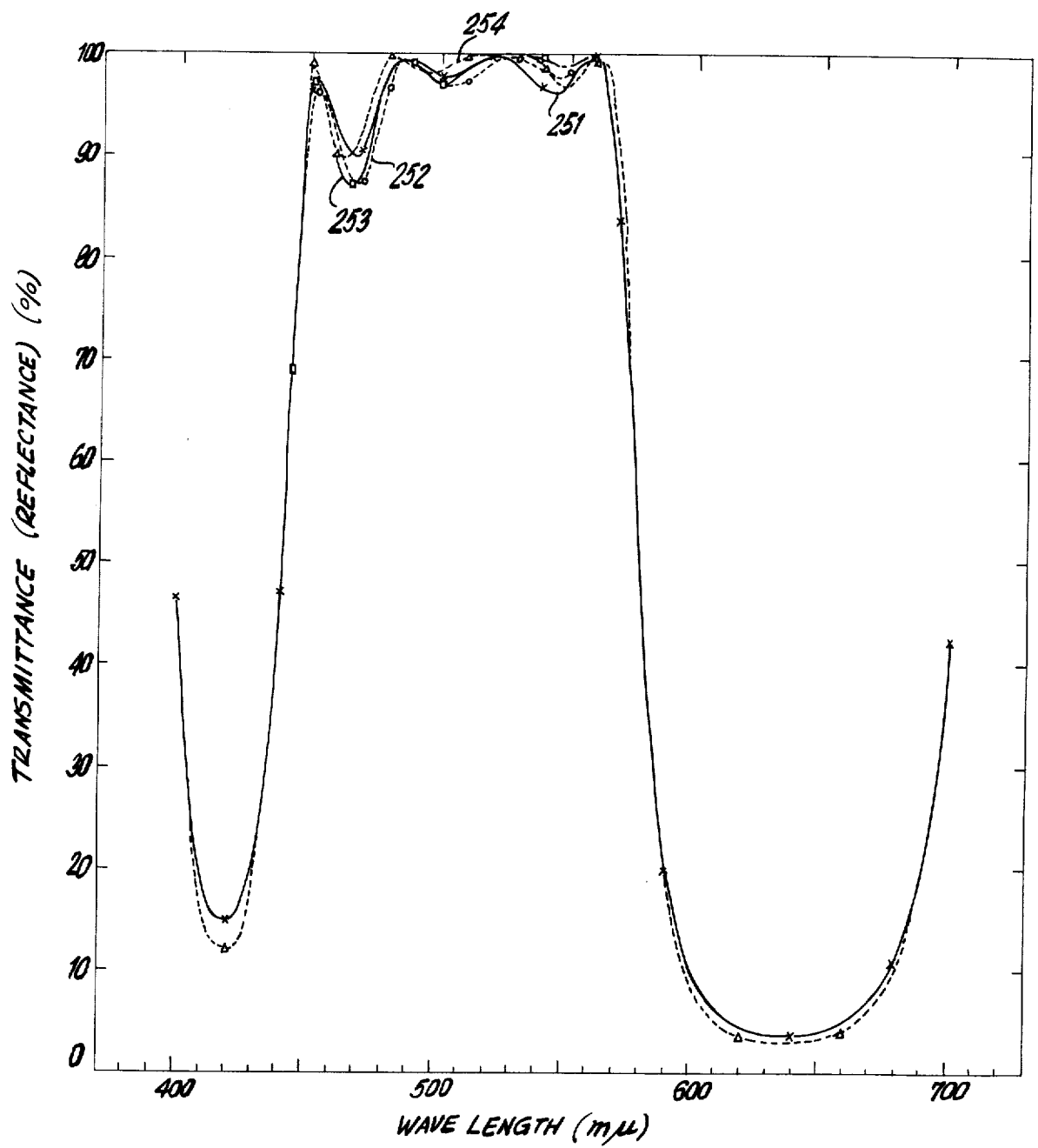

FIG. 14 shows transmittivity curves when the values shown in Table 101 are used as the optimum values and the first layer, second layer and last layer are varied within a range of ± 0.15 × ($\lambda_o/4$ embracing their optimum values of $\lambda_1$ = 313.5 mμ, $\lambda_2$ = 88 mμ, $\lambda_3$ = 176 mμ. The values of the first layer, the second layer and the 10th layer (last layer) of curves 201, 202, 203 and 204 are shown in Table 200. As shown by FIG. 14, ripple appearing around 520 mμcan be held down to a satisfactorily small level as shown in FIG. 14 even if the first layer, the second layer, and the last layer are somewhat deviated from the optimum value, showing satisfactory transmittivity in a range of 500 mμto 600 mμ. In FIG. 15 the transmittivity curve, when the values of the first layer, second layer and last layer are varied and the value of Table 103 is the optimum value, is shown. Similarly, the curve employing the values of Table 106-A as the optimum values is shown in FIG. 16, the curve employing Table 108 is shown in FIG. 17, and the curve employing Table 109 is shown in FIG. 18, while the curve employing Table 114 is shown in FIG. 19. Also values of the first layer, the second layer and the last layer of each curve in FIG. 15 to FIG. 19 are shown in Table 210 to Table 250. In each case, ripple can be held to a satisfactorily small level within the desired range. This means that the film thickness of the layer which is to be varied being, shown in Table 101 to Table 115, should be within a range of ± 0.15 × ($\lambda_o/4$) (wherein $\lambda_o$ is the design wavelength in air) embracing their optimum values.

Table 200

(FIG. 14)

| | 1st layer | 2nd layer | last layer |
|---|---|---|---|
| Curve 201 | 2.7H (297mμ) | 0.8L (88mμ) | 1.7L (187mμ) |
| Curve 202 | 2.8H (308mμ) | 0.7L (77mμ) | 1.7L (187mμ) |
| Curve 203 | 2.94H (323mμ) | 0.7L (77mμ) | 1.6L (176mμ) |
| Curve 204 | 2.94H (323mμ) | 0.8L (88mμ) | 1.5L (165mμ) |

Table 210

(FIG. 15)

| | 1st layer | 2nd layer | last layer |
|---|---|---|---|
| Curve 211 | 0.45H (46.1mμ) | 0.8L (82mμ) | 1.96L (200.9mμ) |
| Curve 212 | 0.45H (46.1mμ) | 0.9L (92.3mμ) | 1.85L (189.6mμ) |
| Curve 213 | 0.55H (56.4mμ) | 0.7L (71.8mμ) | 1.96L (200.9mμ) |
| Curve 214 | 0.66H (67.7mμ) | 0.8L (82mμ) | 1.75L (179.4mμ) |

Table 220

(FIG. 16)

| | 1st layer | 2nd layer | last layer |
|---|---|---|---|
| Curve 221 | 1.45H (228.4mμ) | 1.2L (189mμ) | 1.65L (259.9mμ) |
| Curve 222 | 1.55H (244.1mμ) | 1.1L (173.3mμ) | 1.55L (244.1mμ) |
| Curve 223 | 1.55H (244.1mμ) | 1.1L (173.3mμ) | 1.65L (259.9mμ) |
| Curve 224 | 1.66H (261.5mμ) | 1.2L (189mμ) | 1.42H (223.7mμ) |

Table 230

(FIG. 17)

| | 1st layer | 2nd layer | last layer |
|---|---|---|---|
| Curve 231 | 1.15H (189.8mμ) | 1.15L (189.8mμ) | 1.4H (231mμ) |

Table 230-continued (FIG. 17)

| | 1st layer | 2nd layer | last layer |
|---|---|---|---|
| Curve 232 | 1.32H (217.8mμ) | 1.15L (189.8mμ) | 1.2H (198mμ) |

Table 240

(Fig. 18)

| | 1st layer | 2nd layer | last layer |
|---|---|---|---|
| Curve 241 | 0.45L (47.3mμ) | 0.55H (57.8mμ) | 1.9L (199.5mμ) |
| Curve 242 | 0.45L (47.3mμ) | 0.66H (69.3mμ) | 1.9L (199.5mμ) |
| Curve 243 | 0.55L (57.8mμ) | 0.66H (69.3mμ) | 1.8L (189mμ) |
| Curve 244 | 0.68L (71.4mμ) | 0.45H (47.3mμ) | 1.7L (178.5mμ) |
| Curve 245 | 0.68L (71.4mμ) | 0.55H (57.8mμ) | 1.7L (178.5mμ) |

Table 250

(FIG. 19)

| | 1st layer | 2nd layer | last layter |
|---|---|---|---|
| Curve 251 | 1.1L (173.3mμ) | 3.1H (488.3mμ) | 0.66L (104mμ) |
| Curve 252 | 1.1L (173.3mμ) | 3.16H (497.7mμ) | 0.66L (104mμ) |
| Curve 253 | 1.2L (189mμ) | 3.16H (497.7mμ) | 0.55L (86.6mμ) |
| Curve 254 | 1.3L (204.8mμ) | 3.1H (488.3mμ) | 0.45L (70.9mμ) |

While specific embodiments of the invention have been shown and described in detail to illustrate the application of the principles of the invention, it will be understood that the invention may be embodied otherwise without departing from such principles.

What is claimed is:

1. A dichroic mirror, in which ripple is eliminated, consisting of a substrate and 10-layer films coated over said substrate, said substrate having an index of refraction of 1.52, and said 10-layer films being composed of alterating layers of a high index material having an index of refraction of 2.20 and a low index material having an index refraction of 1.38, and the layer contacting with said substrate is a high index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is (2.85/4) $\lambda_o$, the optical thickness of said second layer is (0.8/4) $\lambda_o$, and the optical thickness of said outermost layers if (1.6/4) $\lambda_o$.

2. A dichroic mirror, in which ripple is eliminated, consisting of a substrate and 11-layer films coated over said substrate, said substrate having an index of refraction of 1.52, and said 11-layer films being composed of alternating layers of a high index material having an index of refraction of 2.20 and a low index material having an index of refraction of 1.38, and the layer contacting with said substrate is a high index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is $(2.8/4)\lambda_o$, the optical thickness of said second layer is $(0.8/4)\lambda_o$, and the optical thickness of said outermost layer is $(2.7/4)\lambda_o$.

3. A dichroic mirror, in which ripple is eliminated, consisting of a substrate and 10-layer films coated over said substrate, said substrate having an index of refraction of 1.52, and said 10-layer films being composed of alternating layers of a high index material having an index of refraction of 2.20 and a low index material having an index of refraction of 1.38, and the layer contacting with said substrate is a high index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is $(3.1/4)\lambda_o$, the optical thickness of said second layer is $(1.1/4)\lambda_o$, and the optical thickness of said outermost layer is $(0.6/4)\lambda_o$.

4. A dichroic mirror, in which ripple is eliminated, consisting of a substrate and 11-layer films coated over said substrate, said substrate having an index of refraction of 1.52, and said 11-layer films being composed of alternating layers of a high index material having an index of refraction of 2.20 and a low index material having an index of refraction of 1.38, and the layer contacting with said substrate is a high index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is $(1.6/4)\lambda_o$, the optical thickness of said second layer is $(1.2/4)\lambda_o$, and the optical thickness of said outermost layers if $(1.5/4)\lambda_o$.

5. A dichroic mirror, in which ripple is eliminated, consisting of a substrate and 11-layer films coated over said substrate, said substrate having an index of refraction of 1.52, and said 11-layer films being composed of alternating layers of a high index material having an index of refraction of 2.20 and a low index material having an index of refraction of 1.38, and the layer contacting with said substrate is a high index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is $(3.2/4)\lambda_o$, the optical thickness of said second layer is $(1.2/4)\lambda_o$, and the optical thickness of said outermost layer is $(3.15/4)\lambda_o$.

6. A dichroic mirror, in which ripple is eliminated, consisting of a substrate and 12-layer films coated over said substrate, said substrate having an index of refraction of 1.52, and said 12-layer films being composed of alternating layers of a high index material having an index of refraction of 2.20 and a low index material having an index of refraction of 1.38, and the layer contacting with said substrate is a low index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is $(0.6/4)\lambda_o$, the optical thickness of said second layer is $(2.8/4)\lambda_o$, and the optical thickness of said outermost layers if $(2.7/4)\lambda_o$.

7. A dichroic mirror, in which ripple is eliminated, consisting of a substrate and 11-layer films coated over said substrate, said substrate having an index of refraction of 1.52, and said 11-layer films being composed of alternating layers of a high index material having an index of refraction of 2.20 and a low index material having an index of refraction of 1.38, and the layer contacting with said substrate is a low index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is $(0.6/4)\lambda_o$, the optical thickness of said second layer is $(2.9/4)\lambda_o$, and the optical thickness of said outermost layers if $(1.6/4)\lambda_o$.

8. A dichroic mirror, in which ripple is eliminated, consisting of a substrate and 12-layer films coated over said substrate, said substrate having an index of refraction of 1.52, and said 12-layer films being composed of alternating layers of a high index material having an index of refraction of 2.20 and a low index material having an index of refraction of 1.38, and the layer contacting with said substrate is a low index material, said high index layers each having a basic design optical thickness of $\frac{3}{4}\lambda_o$, and said low index layers each having a basic design optical thickness of $\frac{1}{4}\lambda_o$, wherein $\lambda_o$ is a design wave length in air, whereby the first, the second and the outermost layers counting from the substrate have optical thickness slightly deviated from the corresponding basic optical thickness, the optical thickness of said first layer is $(1.3/4)\lambda_o$, the optical thickness of said second layer is $(1.5/4)\lambda_o$, and the optical thickness of said outermost layers is $(1.5/4)\lambda_o$.

9. A dichroic mirror, in which ripple is eliminated, consisting of a substrate and 12-layer films coated over said substrate, said substrate having an index of refraction of 1.52, and said 12-layer films being composed of alternating layers of a high index material having an index of refraction of 2.20 and a low index material having an index of refraction of 1.38, and the layer contacting with said substrate is a low index material, said high index layers each having a basic design optical thickness of $\frac{3}{4}\lambda_o$, and said low index layers each having a basic design optical thickness of $\frac{1}{4}\lambda_o$, wherein the first, the second and the outermost layers counting from the substrate have optical thickness slightly deviated from the corresponding basic optical thickness, the optical thickness of said first layer is $(1.3/4)\lambda_o$, the optical thickness of said second layer is $(3.15/4)\lambda_o$, and the optical thickness of said outermost layers is $(3.3/4)\lambda_o$.

10. A dichroic mirror, in which ripple is eliminated, consisting of a substrate and 11-layer films coated over said substrate, said substrate having an index of refraction of 1.52, and said 11-layer films being composed of alternating layers of a high index material having an index of refraction of 2.20 and a low index material having an index of refraction of 1.38, and the layer contacting with said substrate is a low index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is (1.2/4) λ$_o$, the optical thickness of said second layer is (3.1/4) λ$_o$, and the optical thickness of said outermost layers if (0.6/4) λ$_o$.

11. A dichroic mirror, in which ripple is eliminated, consisting of a substrate and 14-layer films coated over said substrate, said substrate having an index of refraction of 1.52, and said 14-layer films being composed of alternating layers of a high index material having an index of refraction of 2.20 and a low index material having an index of refraction of 1.38, and the layer contacting with said substrate is a high index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is (0.6/4) λ$_o$, the optical thickness of said second layer if (0.8/4) λ$_o$, and the optical thickness of said outermost layers is (1.9/4) λ$_o$.

12. A dichroic mirror, in which ripple is eliminated, consisting of a substrate and 15-layer films coated over said substrate, said substrate having an index of refraction of 1.52, and said 15-layer films being composed of alternating layers of a high index material having an index of refraction of 2.20 and a low index material having an index of refraction of 1.38, and the layer contacting with said substrate is a high index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is (0.6/4) λ$_o$, the optical thickness of said second layer is (0.8/4) λ$_o$, and the optical thickness of said outermost layers if (0.5/4) λ$_o$.

13. A dichroic mirror, in which ripple is eliminated, consisting of a substrate and 14-layer films coated over said substrate, said substrate having an index of refraction of 1.52, and said 14-layer films being composed of alternating layers of a high index material having an index of refraction of 2.20 and a low index material having an index of refraction of 1.38, and the layer contacting with said substrate is a high index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is (1.2/4) λ$_o$, the optical thickness of said second layer is (1.15/4) λ$_o$, and the optical thickness of said outermost layers is (0.6/4) λ$_o$.

14. A dichroic mirror, in which ripple is eliminated, consisting of a substrate and 13-layer films coated wover said substrate, said substrate having an index of refraction of 1.52, and said 13-layer films being composed of alternating layers of a high index material having an index of refraction of 2.20 and a low index material having an index of refraction of 1.38, and the layer contacting with said substrate is a high index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is (1.25/4) λ$_o$, the optical thickness of said second layer is (1.1/4) λ$_o$, and the optical thickness of said outermost layers is (1.3/4) λ$_o$.

15. A dichroic mirror, in which ripple is eliminated, consisting of a substrate and 14-layer films coated over said substrate, said substrate having an index of refraction of 1.52, and said 14-layer films being composed of alternating layers of a high index material having an index of refraction of 2.20 and low index material having an index of refraction of 1.38, and the layer contacting with said substrate is a low index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is (0.6/4) λ$_o$, the optical thickness of said second layer is (0.6/4) λ$_o$, and the optical thickness of said outermost layer is (0.5/4) λ$_o$.

16. A dichroic mirror, in which ripple is eliminated, consisting of a substrate and 13-layer films coated over said substrate, said substrate having an index of refraction of 1.52, and said 13-layer films being composed of alternating layers of a high index material having an index of refraction of 2.20 and a low index material having an index of refraction of 1.38, and the layer contacting with substrate is a low index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is (0.6/4) λ$_o$, the optical thickness of said second layer is (0.6/4) λ$_o$, and the optical thickness of said outermost layers is (1.8/4) λ$_o$.

17. A dichroic mirror, in which ripple is eliminated, consisting of a substrate and 14-layer films coated over said substrate, said substrate having an index of refraction of 1.52, and said 14-layer films being composed of alternating layers of a high index material having an index of refraction of 2.20 and a low index material having an index of refraction of 1.38, and the layer contacting with said substrate is a low index material, said high index layers each having a basic design optical thickness of ¼λ$_o$, and said low index layers each having a basic design optical thickness of ¼λ$_o$, wherein λ$_o$ is a design wave length in air, whereby the first, the second and the outermost layers counting from the substrate have optical thickness slightly deviated from the corresponding basic optical thickness, the optical thickness of said first layer is 1.3/4 λ$_o$, the optical thickness of said second layer is 1.25/4 $\lambda_o$, and the optical thickness of said outermost layers is 1.3/4 $\lambda_o$.

18. A dichroic mirror, in which ripple is eliminated, consisting of a substrate and 13-layer films coated over said substrate, said substrate having an index of refraction of 1.52, and said 13-layer films being composed of alternating layers of a high index material having an index of refraction of 2.20 and a low index material having an index of refraction of 1.38, and the layer contacting with said substrate is a low index material, said high index layers each having a basic design optical thickness of ¼$\lambda_o$, and said low index layers each having a basic design optical thickness of ¼$\lambda_o$, wherein $\lambda_o$ is a design wave length in air, whereby the first, the second and the outermost layers counting from the substrate having optical thickness slightly deviated from the corresponding basic optical thickness, the optical thickness of said first layer is (1.3/4) $\lambda_o$, the optical thickness of said second layer is (1.25/4) $\lambda_o$, and the optical thickness of said outermost layers is (0.6/4) $\lambda_o$.

* * * * *